(12) United States Patent
Neiser et al.

(10) Patent No.: US 9,016,456 B1
(45) Date of Patent: Apr. 28, 2015

(54) ARCUATE ROLLER CONVEYOR

(71) Applicant: Intelligrated Headquarters, LLC, Mason, OH (US)

(72) Inventors: Raymond R. Neiser, Batavia, OH (US); Eric J. Glazier, Oxford, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 14/150,874

(22) Filed: Jan. 9, 2014

Related U.S. Application Data

(60) Provisional application No. 61/750,608, filed on Jan. 9, 2013.

(51) Int. Cl.
*B65G 13/08* (2006.01)
*B65G 13/02* (2006.01)

(52) U.S. Cl.
CPC ............... *B65G 13/08* (2013.01); *B65G 13/02* (2013.01)

(58) Field of Classification Search
CPC ................................ B65G 13/08; B65G 13/02
USPC .................... 198/787; 193/35 R, 37, 35 S
See application file for complete search history.

(56) References Cited

U.S. PATENT DOCUMENTS

| | | | | |
|---|---|---|---|---|
| 982,920 | A * | 1/1911 | Aab | 198/611 |
| 1,959,157 | A * | 5/1934 | Eggleston | 198/787 |
| 2,624,445 | A * | 1/1953 | Wallman | 198/787 |
| 5,107,982 | A * | 4/1992 | Walter | 198/781.04 |
| 5,193,233 | A * | 3/1993 | Miller | 5/81.1 R |
| 6,286,660 | B1 * | 9/2001 | Kalm | 198/782 |
| 7,299,909 | B1 * | 11/2007 | Houghton | 193/37 |
| 2002/0074208 | A1 * | 6/2002 | Nimmo et al. | 193/35 R |
| 2006/0151298 | A1 * | 7/2006 | Deur | 198/787 |
| 2008/0164126 | A1 * | 7/2008 | Freudelsperger | 198/787 |
| 2009/0272620 | A1 * | 11/2009 | Dallum et al. | 193/37 |
| 2011/0168520 | A1 * | 7/2011 | Gagnon | 193/37 |
| 2012/0267213 | A1 * | 10/2012 | Lemay | 193/37 |

* cited by examiner

*Primary Examiner* — Mark A Deuble
(74) *Attorney, Agent, or Firm* — Frost Brown Todd LLC

(57) ABSTRACT

A material handling system incorporates one or more arcuate conveying surfaces defined by rollers with a large conveyor radius. The rollers may be tapered rollers, and may be live rollers.

16 Claims, 3 Drawing Sheets

ARCUATE ROLLER CONVEYOR

This application claims priority to U.S. provisional patent application Ser. No. 61/750,608, which was filed on Jan. 9, 2013, the entirety of which is incorporated herein by reference for all purposes.

BACKGROUND

The present disclosure relates generally to material handling systems, and is more particularly directed to a material handling system and subsystems thereof having one or more conveyor sections in which an arcuate conveying surface is defined by rollers. The innovation will be disclosed in connection with, but not necessarily limited to, arcuate conveying surfaces defined by rollers and which have a large conveyor radius.

BRIEF DESCRIPTION OF THE DRAWINGS

The accompanying drawings illustrate embodiments and, together with specification, including the detailed description which follows, serve to explain the principles of the present innovation.

Figure 1:
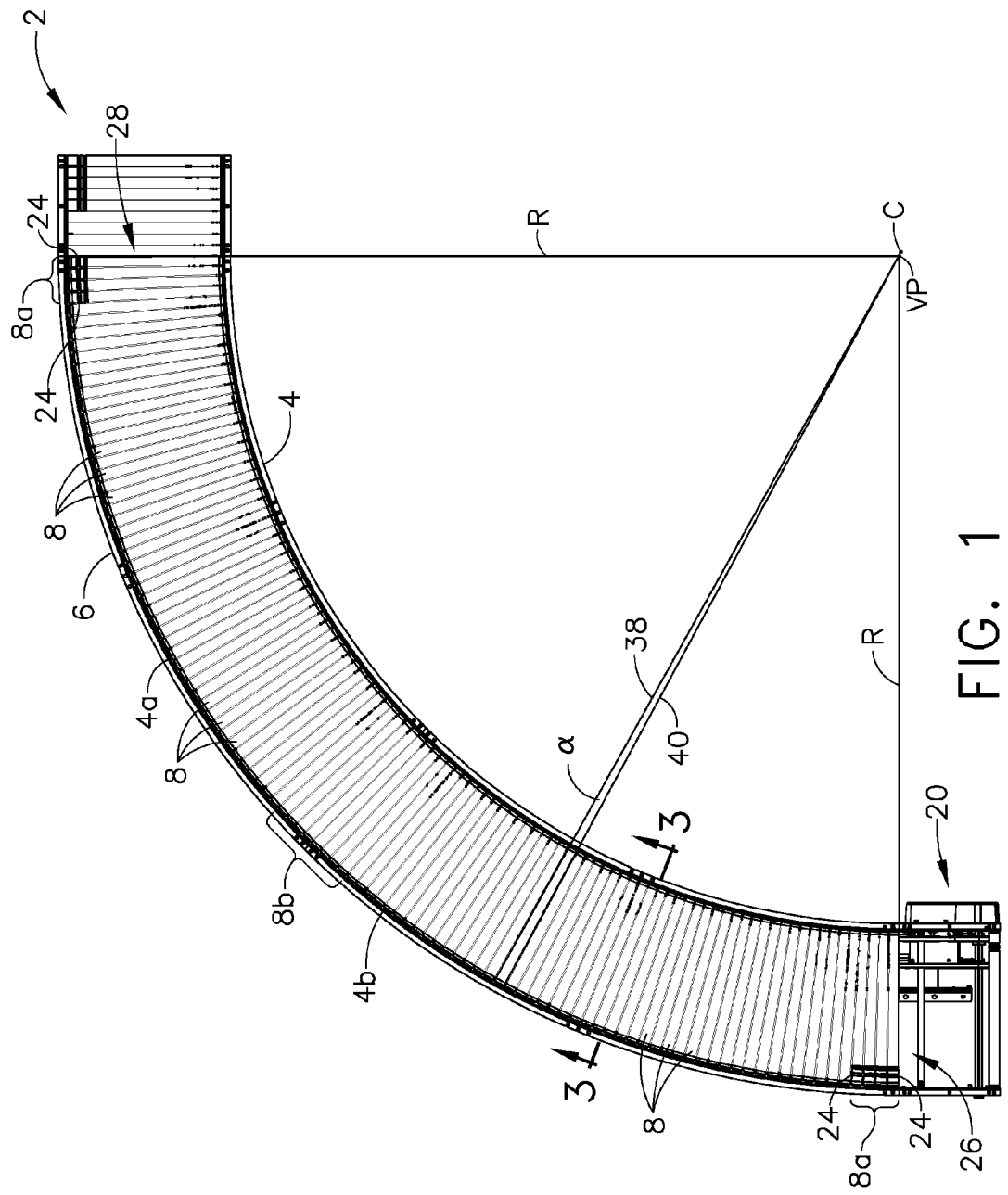
FIG. 1 is a plan view illustrating a arcuate conveyor section with rollers.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Figure 2:
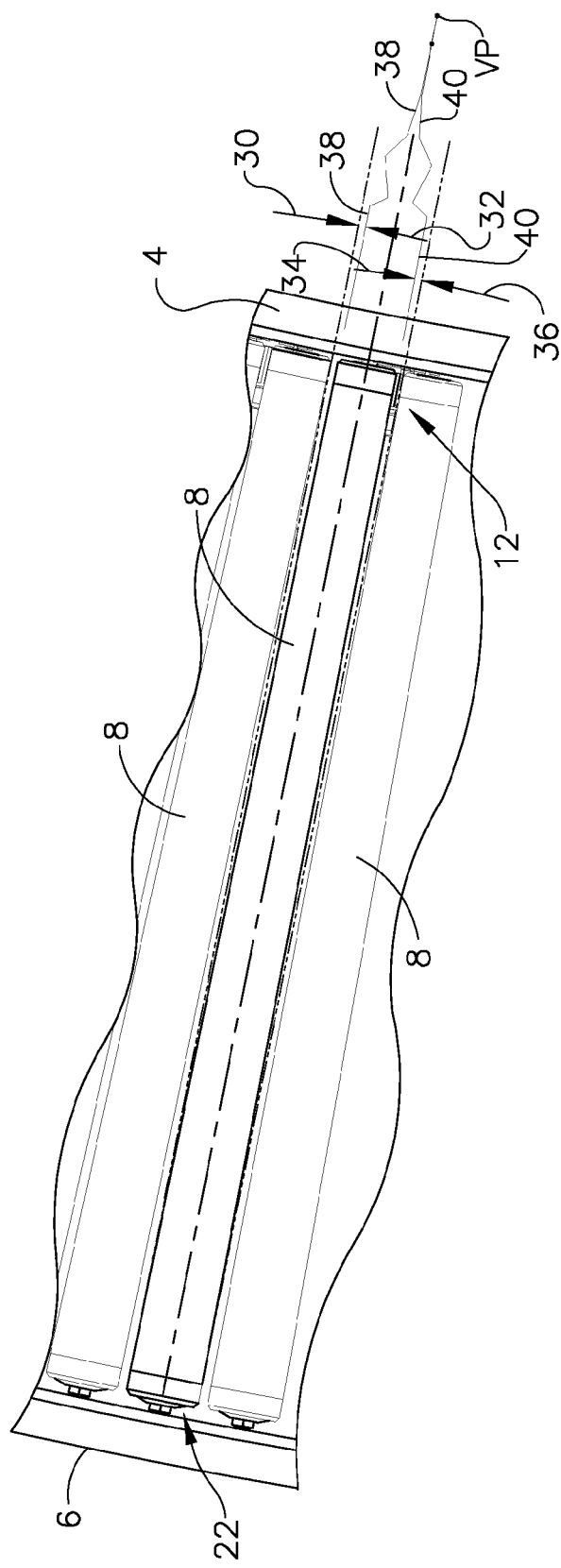
FIG. 2 is an enlarged fragmentary plan view illustrating three rollers of the arcuate conveyor section of FIG. 1.
Figure 3:
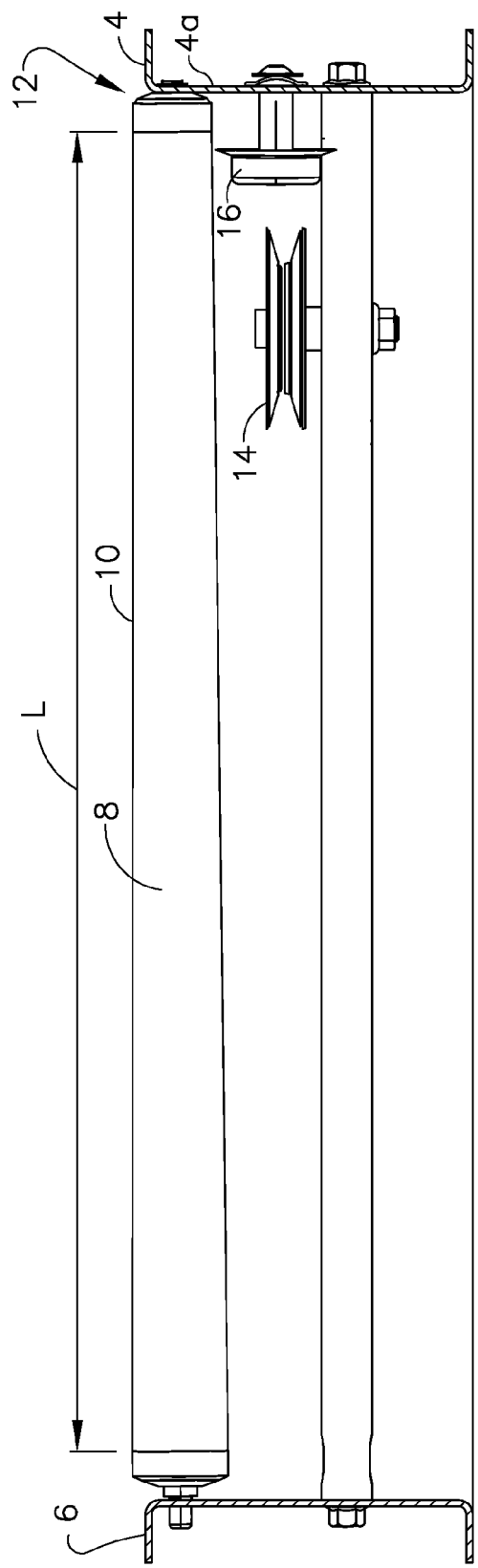
FIG. 3 is a side cross-sectional view taken along line 3-3 of FIG. 1.

Referring to FIGS. 1-3, there is illustrated conveyor section, generally indicated at 2, which is arcuate. Conveyor section 2 includes two spaced apart frame members, inner frame 4 and outer frame 6, which support a plurality of rollers 8 rotatably about each roller's respective axis in a well known manner. In the embodiment depicted, frame members 4 and 6 are arcuate, with conveyor section 2 covering a 90° arc. In the embodiment depicted, conveyor section 2 is comprised of two 45° sections 4a and 4b, connected together at 8b.

Each roller 8 has upper tangent edge 10 such that, in the supported orientation, upper tangent edges 10 of the plurality of rollers 8 collectively form and define the arcuate conveying surface of conveyor section 2, covering a 90° arc, although the present invention is not so limited and the arcuate conveying surface may be of any arc length. It is noted that support of rollers 8 is not limited to frame, nor specifically limited to inner frame 4 and outer frame 5: Rollers 8 may be supported in any manner so as to define the arcuate conveying surface.

The arcuate conveying surface defined by rollers 8 of conveyor section 2 has a conveyor radius R extending from center C to reference points associated therewith. The reference points of the arcuate conveying surface are collectively referred to herein as a reference arc. The reference arc of the arcuate conveying surface may be considered as coinciding with inner frame member 4, such as web portion 4a. The reference arc can be considered to coincide with any portion of conveyor section 2, such as inner ends 12 of rollers 8. Although in the embodiment depicted the reference arc and, concomitantly the arcuate conveying surface, have a constant length conveyor radius, the reference arc and therefore the arcuate conveying surface may comprise a plurality of arcuate segments having different length conveyor radii, and non-coincident centers C.

A material handling system may include any suitable number of conveyor sections 2, disposed at any suitable location. In a material handling system, articles are conveyed from upstream conveyors or subsystems onto the conveying surface of conveyor section 2. The articles move in a downstream direction, carried by the conveying surface of conveyor section 2, and are discharged from conveyor section 2 to a downstream conveyor or subsystem.

Rollers 8 may be driven. Driven rollers are referred to as live rollers. Many different drive configurations are known, such as being driven by v-belts, round belts, line shaft, or each roller 8 may be a motorized drive roller. FIG. 3 illustrates a few components, of a v-belt drive, such as idler wheels 16 and 18. U.S. Pat. No. 5,826,702, the disclosure of which is incorporated herein by reference, describes a v-belt drive system. Conveyor section 2 includes drive 20 which may be configured to drive a v-belt which is urged against rollers 8. Some rollers 8, indicated generally by 8a, may include groves adjacent outer end 22. Round belts 24 may be disposed in the groves of rollers 8a, as is well known, so that rollers 8a at entrance 26 and exit 28 of conveyor section 2 are reliably driven. A v-belt drive does not always completely engage rollers 8a at entrance 26 and exit 28.

In the embodiment depicted, as is known, each roller 8 is tapered: the diameter, $d_o$, of outer end 22 is larger than the diameter, $d_i$ of inner end 12, giving rollers 8 a frusto conical shape. Concomitantly, $r_o$, the radius of outer end 22 is larger than r, the radius of inner end 12. As seen in FIG. 2, the distance between arrows 30 and 32, and arrows 34 and 36, represent the amount of the taper as the distance between $r_o$ and $r_i$ ($r_o - r_i$). A characteristic referred to as the rate of taper is used to quantitatively describe the amount of taper. The rate of taper is the difference between the diameter of outer end 22 and inner end 12, divided by taper length L of roller 8:

$$\text{rate taper} = \frac{d_o - d_i}{L}$$

L is the length of that portion of roller 8 which is tapered. It is noted that roller 8 is cylindrical at each end, where the bearings supporting roller 8 are located. An angle, $\alpha$, is formed as a result of the taper. The angle is related to the rate of taper as:

$$\sin\frac{\alpha}{2} = \frac{1}{2} \times \frac{d_o - d_i}{L} = \frac{r_o - r_i}{L}$$

The taper of each roller 8 has vanishing point VP at the convergence of the taper, represented by lines 38 and 40, which by the geometry as defined lies in the same plane as the conveying surface. A known design objective for an arcuate conveying surface of a conveyor section having rollers, is a true taper, in which vanishing point VP of each roller coincides with center C of the conveyor radius R. While a design objective, the present invention is not limited to coincident vanishing points VP and center C.

Typically, curved roller conveyors are known for use in areas of limited space, and have small conveyor radius, such as 30 inches to 48 inches, being operated at lower speeds, such as less than 300 feet per minute (FPM), in order to maintain control of the articles being conveyed. Such prior art curved live roller conveyor sections are known to have the inner ends of the rollers located on 3 inch centers, with the center distance for the roller outer ends dependent on the roller length, sometimes as high as 4.5 inches and 5 inches. In some instances, the inner ends of the rollers of prior art curved live roller conveyors may be disposed on 2 inch centers, locating the outer ends of the rollers on about 3.050 inch centers for a 22 inch long roller, and providing improvement for conveying smaller articles.

However, despite the known use of 2 inch centers, the prior art approach to achieve adequate carton control at speeds higher than 300 FPM, curved conveyors were exclusively belt conveyors. Prior art large radius curved conveyors, which provide reduced centripetal force on the conveyed articles and improved article stability, were exclusively belt conveyors.

Conveyor section 2 constructed in accordance with the teachings of the present invention has conveyor radius R which is larger than known prior art conveyor radii for a curved roller conveyor section. For example, the present innovation utilizes a large conveyor radius R—any length greater than 60 inches, which in the embodiment depicted may be 120 inches, substantially larger than the 60 inch conveyor radius known in the art. The conveyor radius may be greater than 120 inches, subject to physical space available limitations.

The present innovation utilizes rollers arranged to define an arcuate conveying surface having a large conveyor radius, allowing, but not limited to, operation at high speeds, such as higher than 300 FPM. Rollers 8 of conveyor section 2 may have a rate of taper of 0.0129, in contrast to prior art rates of taper in the range of 0.030 to 0.060. Reducing the diameter of inner ends 12 of rollers 8 permits the roller center distance to be decreased below that known in the art to, for example, nominally 1.75 inches, and more specifically 1.745 inches. For rollers having a length of 28 inches, the roller center distance at outer ends 22 of rollers 8, may be maintained small, such as 2.155 inches. With a diameter for inner ends 12 of rollers 8 such as 1.5625, the diameter of outer ends 22 of rollers 8 may be limited to 1.900.

The present innovation involves the utilization of a large number of rollers, facilitated by the unique sizing of the rollers, thereby improving control and conveyance of the articles carried by the conveying surface to other subsystems of the material handling system. In the embodiment depicted, each 45° section 4a, 4b, is configured with 54 rollers 8, for a total of 108 rollers 8 in conveyor section 2. Thus, the angle between the axis of rotation of adjacent rollers 8 is 90°/108, or 0.833°.

In accordance with the teachings of the present disclosure, the diameter of inner ends 12 and the diameter of outer ends 22 may be set at an exact dimension based on the conveyor radius, roller center distance, and rate of taper. However, commercial considerations lead to selection of the dimensions based on commercial availability of components, such as standard tubing sizes and standard bearing sizes. Another consideration in sizing components is the manufacturing process, such as for example, in the case of a tapered roller, which may be made from commercially available tube by reducing the diameter at the inner end. A large change in diameter from the outer end (the original tube diameter) to the inner end can be problematic because of significant material flow, thus limiting the designed difference in diameters. As is well known, minimizing runout of the rollers is important to create a consistently flat conveying surface.

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A conveyor comprising:
   a. a first plurality of rollers defining an arcuate conveying surface, each of the first plurality of rollers comprising a respective inner end and a respective outer end, and a second plurality of the first plurality of rollers comprising inner ends disposed on centers less than 2 inches;
   b. a reference arc associated with said arcuate conveying surface, said reference arc having at least one conveyor radius length;
   c. said conveyor radius length being greater than 60 inches.

2. The conveyor of claim 1, wherein said conveyor radius length is at least 96 inches.

3. The conveyor of claim 1, wherein said conveyor radius length is at least 120 inches.

4. The conveyor of claim 1, wherein said second plurality comprises outer ends disposed on centers less than 2.375 inches.

5. The conveyor of claim 1, wherein a second plurality of said first plurality of rollers comprise tapered rollers, the tapered rollers comprising a rate of taper less than 0.030.

6. The conveyor of claim 5, wherein the tapered rollers comprise a rate of taper of about 0.0129.

7. A conveyor comprising:
   a. a first plurality of rollers defining an arcuate conveying surface, a second plurality of the first plurality of roller comprising tapered rollers, the tapered rollers comprising a rate of taper of less than 0.030;
   b. a reference arc associated with the arcuate conveying surface, the reference arc having at least one conveyor radius length;
   c. the conveyor radius length being greater than 60 inches.

8. The conveyor of claim 7, wherein the conveyor radius length is at least 96 inches.

9. The conveyor of claim 7, wherein the conveyor radius length is at least 120 inches.

10. The conveyor of claim 7, wherein the tapered rollers comprise a rate of taper of about 0.0129.

11. A material handling system comprising a plurality of conveyor sections, at least one conveyor section of the plurality of conveyor sections comprising:
    a. a first plurality of rollers defining an arcuate conveying surface, each of the first plurality of rollers comprising a respective inner end and a respective outer end, and a second plurality of the first plurality of rollers comprising inner ends disposed on centers less than 2 inches;
b. a reference arc associated with the arcuate conveying surface, the reference arc having at least one conveyor radius length;
c. the conveyor radius length being greater than 60 inches.

12. The conveyor of claim 11, wherein the conveyor radius length is at least 96 inches.

13. The conveyor of claim 11, wherein the conveyor radius length is at least 120 inches.

14. The conveyor of claim 11, wherein the second plurality comprises outer ends disposed on centers less than 2.375 inches.

15. The conveyor of claim 11, wherein a second plurality of the first plurality of rollers comprise tapered rollers, the tapered rollers comprising a rate of taper less than 0.030.

16. The conveyor of claim 15, wherein the tapered rollers comprise a rate of taper of about 0.0129.

* * * * *